United States Patent
McCarthy

(10) Patent No.: US 6,711,415 B1
(45) Date of Patent: Mar. 23, 2004

(54) METHOD AND SYSTEM FOR MINIMIZING TRANSMITTER POWER LEVELS WITHIN A CELLULAR TELEPHONE COMMUNICATIONS NETWORK

(75) Inventor: Michael John McCarthy, University Park, TX (US)

(73) Assignee: Nortel Networks Limited, St. Laurent (CA)

( * ) Notice: Subject to any disclaimer, the term of this patent is extended or adjusted under 35 U.S.C. 154(b) by 1054 days.

(21) Appl. No.: 08/943,427

(22) Filed: Oct. 3, 1997

(51) Int. Cl.[7] .............................. H04B 7/00; H04Q 7/20
(52) U.S. Cl. ...................... 455/522; 455/69; 455/127.1
(58) Field of Search ............................ 455/13.4, 38.3, 455/574, 522, 436, 69, 126, 68, 513, 592, 127.1, 423, 512; 370/338

(56) References Cited

U.S. PATENT DOCUMENTS

| | | | | |
|---|---|---|---|---|
| 4,777,653 A | * | 10/1988 | Bonnerot et al. | 455/69 |
| 5,386,589 A | * | 1/1995 | Kanai | 455/423 |
| 5,448,750 A | * | 9/1995 | Eriksson et al. | 455/452 |
| 5,491,837 A | * | 2/1996 | Haartsen | 455/62 |
| 5,551,057 A | * | 8/1996 | Mitra | 455/592 |
| 5,590,409 A | * | 12/1996 | Sawahashi et al. | 455/69 |
| 5,697,056 A | * | 12/1997 | Tayloe | 455/513 |
| 5,710,982 A | * | 1/1998 | Laborde et al. | 455/69 |

* cited by examiner

Primary Examiner—Edward F. Urban
Assistant Examiner—Simon Nguyen
(74) Attorney, Agent, or Firm—John D. Crane; Bracewell & Patterson, L.L.P.

(57) ABSTRACT

A method and system for minimizing transmitter power levels within a cellular telephone communications network is disclosed. The method and system of the present invention are implemented within a cellular communications network which includes a cellular base station and a cellular telephone. A signal strength measurement is performed between the cellular base station and the cellular telephone. A determination is made periodically as to whether or not the measured signal strength is higher than a first threshold. In response to each determination that the measured signal strength is higher than the first threshold, the transmitter power at the cellular base station is reduced by one step such that the transmitter power levels within the cellular communications network are minimized.

16 Claims, 4 Drawing Sheets

METHOD AND SYSTEM FOR MINIMIZING TRANSMITTER POWER LEVELS WITHIN A CELLULAR TELEPHONE COMMUNICATIONS NETWORK

BACKGROUND OF THE INVENTION

1. Technical Field

The present invention relates to a method and system for improving a telephone communications network in general and, in particular, to a method and system for improving a cellular telephone communications network. Still more particularly, the present invention relates to a method and system for minimizing transmitter power levels within a cellular telephone communications network.

2. Description of the Related Art

In order to provide cellular telephone communications service to a populated area, such as the metropolitan area of a city, the service area must be first divided into small honeycomb-patterned units known as "cells." Each of these cells has a typical radius of about 8 to 12 miles (or 13 to 19 kilometers). If necessary, each cell can be further subdivided into even smaller cells. A cellular base station (or radio transmitter) is then installed in each of these cells within the service area. Each cellular base station within a cell further is connected to a public telephone company via one or more cellular switching networks.

A user within the service area having a widespread range of cellular base stations is able to place and receive telephone calls by utilizing a cellular telephone (or a cellular subscriber unit). Each cellular telephone, which may be portable and mobile, has an assigned cellular telephone number that allows the user to place and receive telephone calls throughout the entire service. As the user is moving from one cell to another, a telephone call currently in-progress is allowed to be handed-over from one cell to another within the service area, without any interruptions. As such, the cellular telephone communications network enables the user to access a standard telephone network from anywhere within the service area, regardless of being in a stationary or a moving position.

In order to minimize the transmitter bandwidth of the cellular base stations within the cellular telephone communications network, typically, an identical range of radio frequencies is utilized repeatedly by each of the cells. Under this arrangement, even though each cell is located adjacent to another, there should not be a concern about interference from the neighboring cells, so long as the neighboring cells do not utilize precisely the same radio channels.

Furthermore, the one key in reducing interference within the cellular telephone communications network is to keep the transmitter power levels of each cellular base station low. Current algorithms for accomplishing this utilizes either a Received Signal Strength Indicator (RSSI) or Carrier/interference (C/I) Indicator as a determinant of whether the current power level of a cellular base station and/or a cellular telephone is too high or too low. The RSSI-based approach of setting transmitter power level is static however, and does not allow for the changing of C/I conditions at any time. In other words, if the transmitter power level of a cellular telephone within the RSSI window has achieved a C/I of 24 dB, the transmitter power level may be reduced while maintaining an acceptable signal. On the other hand, although the C/I-based approach of setting the transmitter power level is more responsive to these conditions, a constant settling to the minimum C/I tends to be the problem for this approach. In other words, if a first cellular telephone is experiencing a drop in C/I caused by a second cellular telephone on the same channel, the first cellular telephone would increase its transmitter power level. This may, in turn, cause the second cellular telephone to experience a drop in C/I such that the second cellular telephone would react by increasing its transmitter power level also. As a result, both cellular telephones will reach the maximum transmitter power eventually, and no in the C/I condition of either of the two cellular telephones can be further achieved.

Consequently, it would be desirable to provide an improved method and system to minimize transmitter power levels within a cellular telephone communications network such that the transmitter power-competing situation as described above may be avoided.

SUMMARY OF THE INVENTION

In view of the foregoing, it is therefore an object of the present invention to provide an improved method and system for a telephone communications network.

It is another object of the present invention to provide an improved method and system for a cellular telephone communications network.

It is yet another object of the present invention to provide an improved method and system for minimizing transmitter power levels within a cellular telephone communications network.

In accordance with the method and system of the present invention, a cellular communications network is provided which includes a cellular base station and a cellular telephone. A signal strength measurement is performed between the cellular base station and the cellular telephone. A determination is made periodically as to whether or not the measured signal strength is higher than a first threshold. In response to each determination that the measured signal strength is higher than the first threshold, the transmitter power at the cellular base station is reduced by one step such that the transmitter power levels within the cellular communications network are minimized.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any cellular telephone communications network. As will be understood by those skilled in the art, the present invention is applicable for both cellular base stations and cellular subscriber units.

Figure 1:
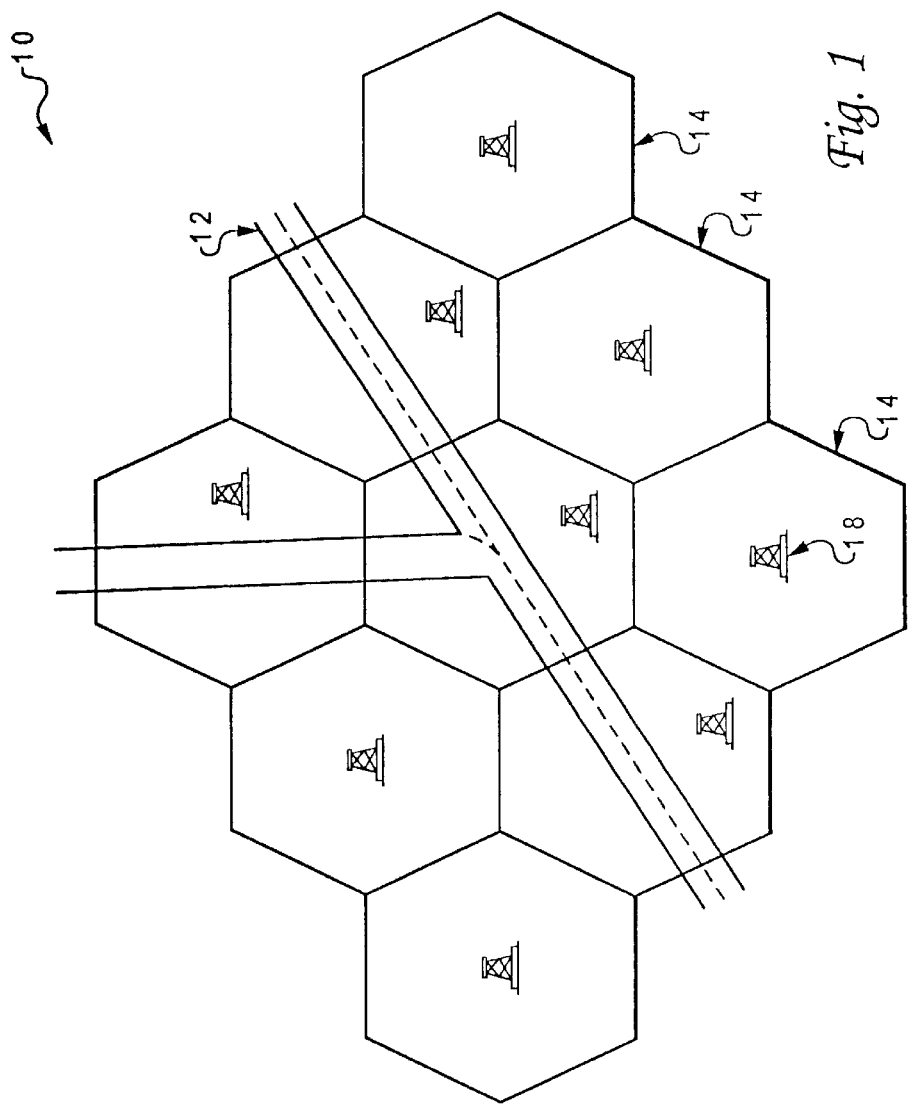
FIG. 1 is a pictorial representation of a cellular telephone communications network in which a preferred embodiment of the present invention may be applicable.

Referring now to the drawings and, in particular, to FIG. 1, there is depicted a pictorial representation of a cellular telephone communications network 10 in which a preferred embodiment of the present invention may be applicable. Cellular telephone communications network 10 is composed of multiple cells 14, each cell encompassing a specific geographical area. As shown, each cell 14 sits adjacent to other neighboring cells in the form of a honeycomb pattern. Within each cell 14, there is a cellular base station 18 interconnected with a public telephone network via a control terminal (not shown). Preferably, the radius of each cell 14 is about 8 to 12 miles (or 13 to 19 kilometers), depending upon the strength of each cellular base station 18 within each cell 14. Further, each cell 14 may include six directional antennas located centrally within the cell, each radiating in a 60° section of the cell.

Cellular telephone communications network 10 also includes various cellular subscriber units (commonly known as cellular telephones) which may be stationary or mobile. Each cellular telephone has an assigned cellular telephone number that allows a user to place and receive calls within a widespread range of each cellular base station 18 throughout network 10. A road 12, as shown in FIG. 1, extends through several cells 14 contained within cellular telephone communications network 10. Thus, a user, while travelling along road 12, may initiate or continue a telephone conversation via a cellular telephone.

Cellular telephone communications network 10 further includes a mobile telephone switching office (MTSO). MTSO is a central office utilized for mobile switching in cellular telephone communications network 10. The MTSO houses a mobile switching center (MSC) and fielded monitoring and relay stations for switching calls from cell sites to wireline central offices such as a telephone company, or a public switched telephone network (PSTN), made up of local networks, exchange-area networks, and long-haul networks that interconnect telephones and other communication devices on a worldwide basis. An MSC can control system operations in analog cellular networks. For example, an MSC can control calls, track billing information, and locate cellular subscriber units. In essence, MSC is a switch that provides services and coordination between mobile users within cellular telephone communications network 10 and other telephone communications networks.

Cellular telephone communications network 10 is an example of a cellular mobile service, a communications service that allows a user to access the public telephone network from a stationary or moving vehicle, and which is based on a combination of radio transmission and telephone switching. Thus, individuals having a small mobile cellular telephone can utilize this system in the same way that telephone calls are made utilizing standard telephone carriers.

Figure 2:
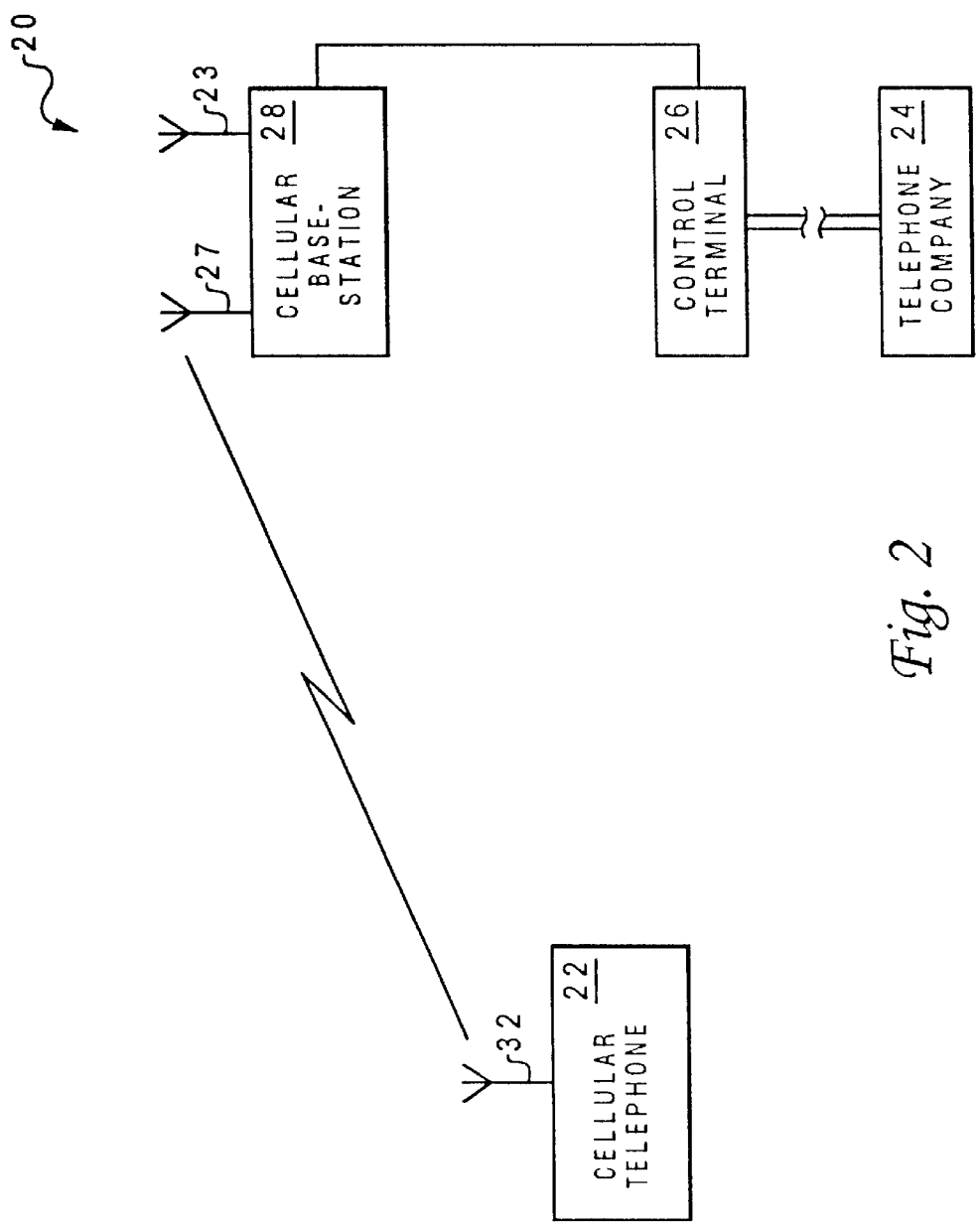
FIG. 2 is a block diagram of the components within a cell of a cellular telephone communications network as shown in FIG. 1, in which a preferred embodiment of the present invention may be implemented.

With reference now to FIG. 2, there is depicted a block diagram of the components within a cell of the cellular telephone communications network as shown in FIG. 1, in which a preferred embodiment of the present invention may be implemented. As shown, cell 20 includes a cellular base station 28 and a control terminal 26. Cellular base station 28 is coupled to control terminal 26 via telephone landlines. In turn, control terminal 26 is coupled, also via telephone landlines, to a telephone communications system 24 of a local telephone company that is located geographically within cell 20. A cellular telephone 22 communicates with cellular base station 28 via antennas 32 and 27, which may be implemented as telescopic whip antennas that can be extended or retracted (ie., lengthened or shortened) by being constructed in the form of overlapping concentric cylinders that slide inside of each other and make electrical contact with each other. The telephone landlines utilized within cell 20 are telephone lines that are placed in areas on land or inland waterways, and include twisted-pair lines, coaxial cables, and fiber-optic cables utilized in overhead, direct-buried, underground, and microwave applications.

Cellular base station 28 incorporates both a receiver antenna 23 and a transmitter antenna 27 for communicating with cellular telephone 22. Cellular telephone 22 may be a mobile unit installed in a vehicle, a transportable unit which is a mobile unit and battery installed in a carrying case, or a hand-held portable unit. Cellular telephone 22 includes an antenna 32 for the cellular radio channels. In the United States, the cellular radio channels are within the frequency band of 824–894 MHz. More specifically, a total bandwidth of 50 MHz is allocated to the cellular telephone service, the 50 MHz distributed between 824 MHz and 849 MHz, and between 869 MHz and 894 MHz of the frequency spectrum. Additional cellular base stations also may be located throughout a geographical area within cell 20 to provide telephone service to cellular telephone 22.

Figure 3:
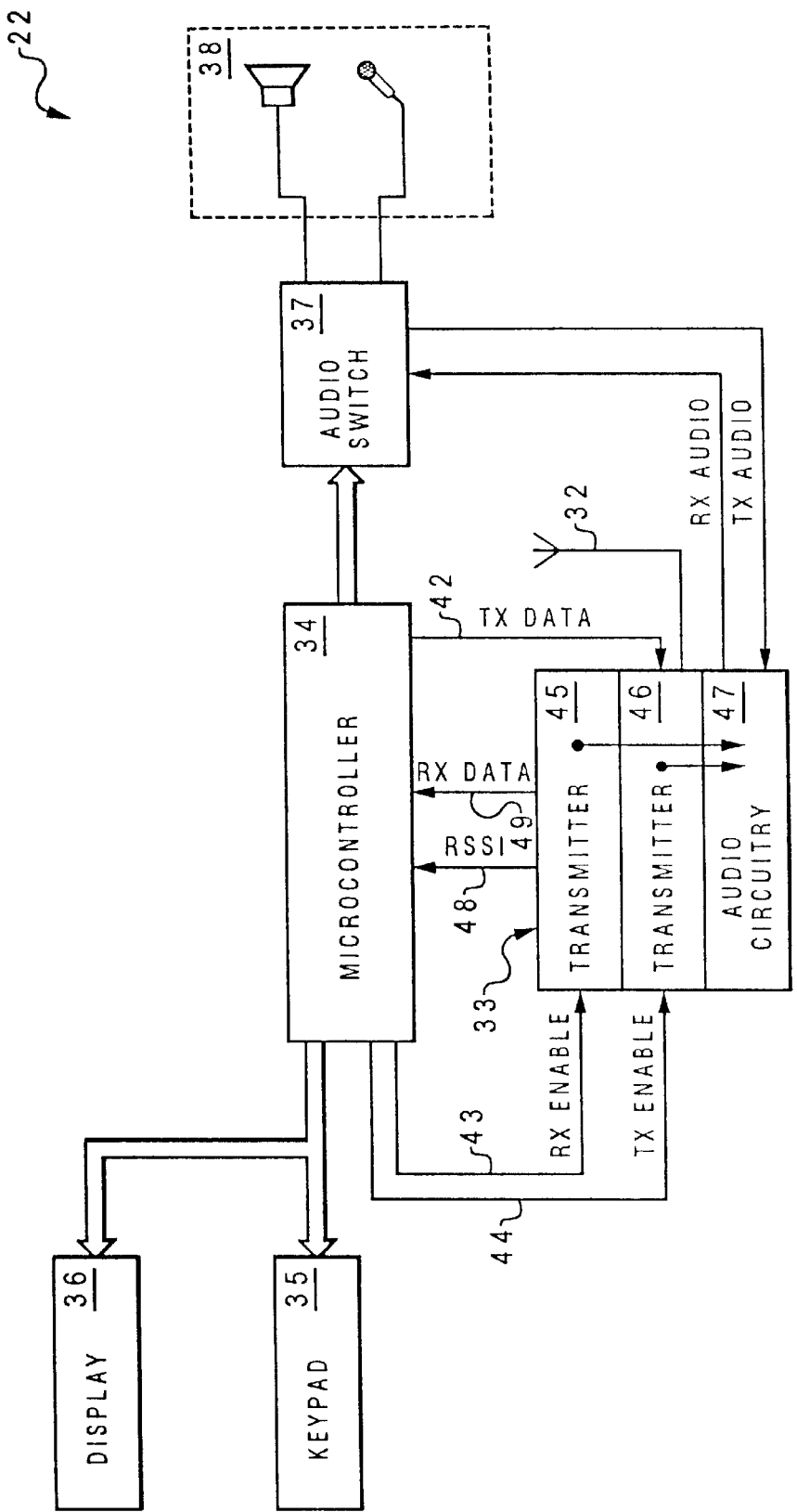
FIG. 3 is a block diagram of a cellular telephone in accordance with a preferred embodiment of the present invention.

Referring now to FIG. 3, there is illustrated a block diagram of cellular telephone 22 which may be implemented in accordance with a preferred embodiment of the present invention. Cellular telephone 22 includes an antenna 32, a transceiver 33, a microcontroller 34, a keypad 35, a display 36, an audio switch 37, and a handset 38. Transceiver 33 further includes a receiver 45, transmitter 46, and an audio circuitry 47. Microcontroller 34 includes a central processing unit (CPU), which is the computational and control unit for interpreting and executing instructions for cellular telephone 22. Keypad 35 is a set of alphanumeric keys that are mounted on a small keyboard dedicated to a specific purpose, such as for dialing telephone numbers. Keypad 35 preferably is modelled after a standard telephone keypad. Display 36 may be any type of display device that visually presents data to a user of cellular telephone 22. Display devices such as a light-emitting diode (LED) or liquid crystal display (LCD) panel can be utilized to implement display 36. Handset 38 includes a speaker and a microphone.

Control signals such as RX ENABLE 43 and TX ENABLE 44 from microcontroller 34 are utilized to enable receiver 45 and transmitter 46, respectively. In addition to control signals 43, 44 to transceiver 33, microcontroller 34 also monitors control signals RSSI 48, RX DATA 49, and TX DATA 42 for detecting signal strength, for detecting received data, and for sending transmitted data, respectively. Note that cellular telephone 22, as depicted in FIG. 3, merely describes one form of a cellular telephone that may be utilized in the present invention. One skilled in the art will appreciate that other types of cellular telephones also may be implemented with a preferred embodiment of the present invention.

Figure 4:
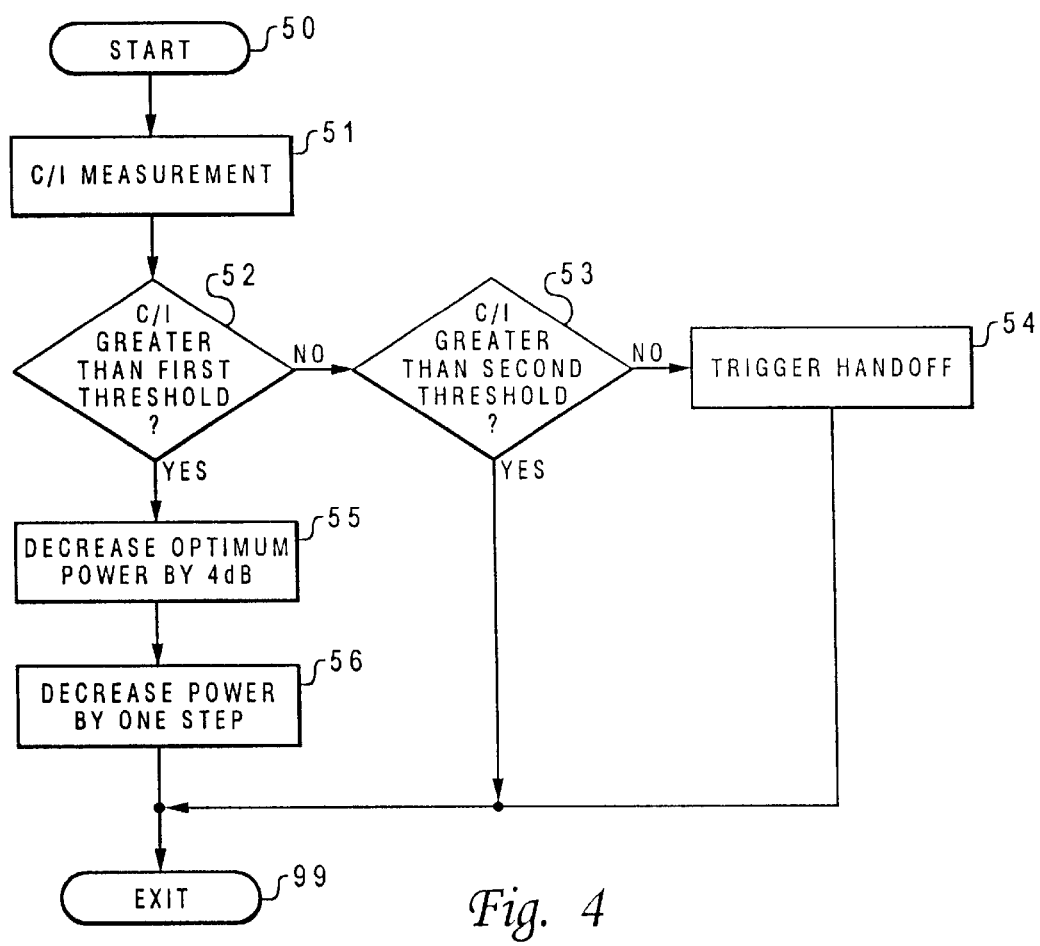
FIG. 4 is a high-level flow diagram of a method for minimizing transmitter power levels within a cellular telephone communications network, in accordance with a preferred embodiment of the present invention.

With reference now to FIG. 4, there is depicted a high-level flow diagram of a method for minimizing transmitter power levels within a cellular telephone communications network, in accordance with a preferred embodiment of the present invention. Starting at block 50, a C/I measurement is performed, as shown in block 51. The C/I measurement, typically associated with Advanced Mobile Phone Service (AMPS), can be estimated in time division multi-access (TDMA) with bit error rate measurements. A determination then is made periodically as to whether or not the measured C/I is higher than a first threshold, as depicted in block 52. The first threshold is a maximum C/I value for the normal operation of the cellular telephone within a cell without wasting power, and is typically about 18 dB. If the measured C/I is not higher than the first threshold, another determination is made as to whether or not the measured C/I is higher than a second threshold, as illustrated in block 53. The second threshold is a minimum acceptable C/I value at which the cellular telephone may still perform properly, and is typically about 17 dB. The C/I range between the first threshold and the second threshold is considered as the normal operating range of acceptable voice quality. If the measured C/I is higher than the second threshold, the process exits at block 99. However, if the measured C/I is not higher than the second threshold, a trigger handoff is performed to transfer the cellular telephone to another channel within the same cell, as shown in block 54, and the process exits at block 99.

However, if the measured C/I is higher than the first threshold, the optimal transmitter power is decreased by 4 dB, as depicted in block 55. Accordingly, the transmitter power also is decreased by one step, as illustrated in block 56. In essence, decreasing transmitter power by one step is actually decreasing the power level by 4 dB on a 0–10 scale. Finally, the process exits at block 99.

As has been described, the present invention provides an improved method for minimizing the transmitter power levels within a cellular telephone communications network.

It also is important to note that, although the present invention has been described in the context of a cellular base station and a cellular telephone, those skilled in the art will appreciate that the mechanisms of the present invention are capable of being distributed as a program product in a variety of forms, and that the present invention applies equally regardless of the particular type of signal-bearing media actually utilized to carry out the distribution. Examples of signal-bearing media include, but are not limited to, recordable-type media such as floppy disks and transmission-type media such as analogue or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for maintaining optimal transmitter power levels within a cellular communications network, wherein said cellular communications network includes a plurality of cellular base stations and a plurality of cellular telephones, said method comprising the steps of:

periodically performing a carrier-to-interference ratio measurement between a first cellular base station and a cellular telephone;

in response to a determination that said measured carrier-to-interference ratio is higher than a carrier-to-interference ratio upper bound, reducing an optimal transmitter power at said cellular base station by one step;

in response to a determination that said measured carrier-to-interference ratio is lower than said first carrier-to-interference ratio upper bound, determining whether or not said measured carrier-to-interference ratio is lower than a carrier-to-interference ratio lower bound;

maintaining said optimal transmitter power at said first cellular base station if said measured carrier-to-interference ratio is between said carrier-to-interference ratio lower bound and said carrier-to-interference ratio upper bound; and handing off said cellular telephone to a different channel within a same cell when said measured carrier-to-interference ratio is lower than said carrier-to-interference ratio lower bound.

2. The method according to claim 1, wherein said carrier-to-interference ratio upper bound is approximately 18 dB.

3. The method according to claim 1, wherein said reducing step further includes a step of reducing said optimal transmitter power at said cellular base station by 4 dB.

4. The method according to claim 1, wherein said carrier-to-interference ratio lower bound is approximately 17 dB.

5. A cellular communications network that is capable of maintaining optimal transmitter power levels, wherein said cellular communications network includes a plurality of cellular base stations and a plurality of cellular telephones, said cellular communications network comprising:

means for periodically performing a carrier-to-interference ratio measurement between a first cellular base station and a cellular telephone;

means for reducing an optimal transmitter power at said cellular base station by one step, in response to a determination that said measured carrier-to-interference ratio is higher than a carrier-to-interference ratio upper bound;

means for determining whether or not said measured carrier-to-interference ratio is lower than a carrier-to-interference ratio lower bound, in response to a determination that said measured carrier-to-interference ratio is lower than said first carrier-to-interference ratio upper bound;

means for maintaining said optimal transmitter power at said first cellular base station when said measured carrier-to-interference ratio is between said carrier-to-interference ratio lower bound and said carrier-to-interference ratio upper bound; and means for handing off said cellular telephone to a different channel within a same cell when said measured carrier-to-interference ratio is lower than said carrier-to-interference ratio lower bound.

6. The cellular communications network according to claim 5, wherein said carrier-to-interference ratio upper bound is approximately 18 dB.

7. The cellular communications network according to claim 5, wherein said means for reducing further includes a means for reducing said optimal transmitter power at said cellular base station by 4 dB.

8. The cellular communications network according to claim 5, wherein said carrier-to-interference ratio lower bound is approximately 17 dB.

9. A computer program product residing in a cellular base station of a cellular communications network for maintaining optimal transmitter power levels within said cellular communications network, wherein said cellular communications network includes a plurality of cellular base stations and a plurality of cellular telephones, said computer program product comprising:

program code means for periodically performing a carrier-to-interference ratio measurement between a first cellular base station and a cellular telephone;

program code means for reducing an optimal transmitter power at said cellular base station by one step, in response to a determination that said measured carrier-to-interference ratio is higher than a carrier-to-interference ratio upper bound;

program code means for determining whether or not said measured carrier-to-interference ratio is lower than a carrier-to-interference ratio lower bound, in response to a determination that said measured carrier-to-interference ratio is lower than said first carrier-to-interference ratio upper bound;

program code means for maintaining said optimal transmitter power at said first cellular base station when said measured carrier-to-interference ratio is between said carrier-to-interference ratio lower bound and said carrier-to-interference ratio upper bound; and program code means for handing off said cellular telephone to a different channel within a same cell when said measured carrier-to-interference ratio is lower than said carrier-to-interference ratio lower bound.

10. The computer program product according to claim 9, wherein said carrier-to-interference ratio upper bound is approximately 18 dB.

11. The computer program product according to claim 9, wherein said program code means for reducing further includes a program code means for reducing said optimal transmitter power at said cellular base station by 4 dB.

12. The computer program product according to claim 9, wherein said carrier-to-interference ratio lower bound is approximately 17 dB.

13. A cellular base station that is capable of maintaining optimal transmitter power levels, said cellular base station comprising:

means for periodically performing a carrier-to-interference ratio measurement;

means for reducing an optimal transmitter power by one step, in response to a determination that said measured carrier-to-interference ratio is higher than a carrier-to-interference ratio upper bound;

means for determining whether or not said measured carrier-to-interference ratio is lower than a carrier-to-interference ratio lower bound, in response to a determination that said measured carrier-to-interference ratio is lower than said first carrier-to-interference ratio upper bound;

means for maintaining said optimal transmitter power when said measured carrier-to-interference ratio is between said carrier-to-interference ratio lower bound and said carrier-to-interference ratio upper bound; and handing off said cellular telephone to a different channel within a same cell when said measured carrier-to-interference ratio is lower than said carrier-to-interference ratio lower bound.

14. The cellular base station according to claim 13, wherein said carrier-to-interference ratio upper bound is approximately 18 dB.

15. The cellular base station according to claim 13, wherein said means for reducing further includes a means for reducing said optimal transmitter power at said cellular base station by 4 dB.

16. The cellular base station according to claim 13, wherein said carrier-to-interference ratio lower bound is approximately 17 dB.

* * * * *